US007983464B2

(12) United States Patent
Xu et al.

(10) Patent No.: US 7,983,464 B2
(45) Date of Patent: Jul. 19, 2011

(54) SYSTEM AND METHOD FOR CORPUS CALLOSUM SEGMENTATION IN MAGNETIC RESONANCE IMAGES

(75) Inventors: Qing Xu, Nashville, TN (US); Hong Chen, Plainsboro, NJ (US); Li Zhang, Skillman, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1027 days.

(21) Appl. No.: 11/782,828

(22) Filed: Jul. 25, 2007

(65) Prior Publication Data

US 2008/0037848 A1 Feb. 14, 2008

Related U.S. Application Data

(60) Provisional application No. 60/821,763, filed on Aug. 8, 2006.

(51) Int. Cl.
*G06K 9/00* (2006.01)
(52) U.S. Cl. .......................... 382/131; 600/410; 600/425
(58) Field of Classification Search .................. 382/128, 382/131, 130; 600/410, 417, 425
See application file for complete search history.

(56) References Cited

U.S. PATENT DOCUMENTS

| 5,078,141 A * | 1/1992 | Suzuki et al. ................ 600/422 |
| 5,652,515 A * | 7/1997 | Kondo ........................... 324/309 |
| 6,138,302 A * | 10/2000 | Sashin et al. ...................... 5/600 |
| 7,095,890 B2 * | 8/2006 | Paragios et al. ............... 382/173 |
| 2005/0165294 A1 * | 7/2005 | Weiss ............................. 600/410 |
| 2005/0254708 A1 | 11/2005 | Jolly et al. |
| 2006/0056698 A1 | 3/2006 | Jolly et al. |
| 2006/0241310 A1 * | 10/2006 | Lan .............................. 549/295 |
| 2007/0160277 A1 | 7/2007 | Slabaugh et al. |
| 2010/0067761 A1 * | 3/2010 | Jakobsson et al. ............ 382/131 |

OTHER PUBLICATIONS

Active Shape Model Segmentation With Optimal Features;Bram van Ginneken; Aug. 2002.*
Cootes, T. F., "Active Shape Models—their Training and Application," *Computer Vision and Image Understanding*, (1995) pp. 38-59, 61:1 Academic Press, Inc.

* cited by examiner

*Primary Examiner* — Wesley Tucker (57) ABSTRACT

A method and system for segmentation of the corpus callosum in MR brain images is disclosed. The method utilizes an active shape model (ASM) with confidence weighting to iteratively adjust an initial corpus callosum contour to define a boundary of the corpus callosum in an MR image. An ASM is used to determine a displacement value in a perpendicular direction of the corpus callosum contour for each node of the corpus callosum contour. The displacement value for each node is then weighted based on a confidence of that displacement value. The ASM is then fitted to the adjusted contour. These steps are iteratively performed until the contour converges to define the corpus callosum boundary. This boundary can be further refined based on intensity distributions in object and background regions defined by the boundary.

21 Claims, 5 Drawing Sheets

SYSTEM AND METHOD FOR CORPUS CALLOSUM SEGMENTATION IN MAGNETIC RESONANCE IMAGES

This application claims the benefit of U.S. Provisional Application No. 60/821,763, filed Aug. 8, 2006, the disclosure of which is herein incorporated by reference.

BACKGROUND OF THE INVENTION

The present invention relates to magnetic resonance brain scanning, and more particularly, to automatic corpus callosum segmentation in magnetic resonance brain images.

Magnetic Resonance (MR) is a well known technique for imaging internal organs of a patient. MR scanners are typically capable of generating cross-sectional images in any plane of the body, including oblique planes. Accordingly, the MR volume data resulting from MR scans can have many possible orientations. In MR brain scanning, the orientation and position of the scanning volumes are typically adjusted manually by experienced MR operators. This process is time-consuming and does not guarantee that all patients are scanned in the same way. Variations in the position and orientation of various MR brain scans can lead to problems with diagnosis when using MR brain images generated from MR brain scans. Thus, automated and consistent MR scan planning is desirable in clinical MR scanning applications.

In conventional MR scanning, scouts/localizers are scans that are acquired first to let MR operators plan the subsequent diagnostic scans. The diagnostic scans typically have a higher resolution and better contrast and are obtained by sequences requiring much longer time. Accordingly, MR operators typically adjust the position and orientation of the scanning for the diagnostic scans with respect to the anatomy of an individual patient in a scout scan. Accordingly, the shape and size of the anatomical structures of a patient's brain is important for determining the position and orientation of the scan. Thus, segmentation of these anatomical structures in MR images is important for implementing automated scan planning. One such anatomical structure that can be useful for automated scan planning is the corpus callosum. However, segmentation of the anatomical structures of the brain, such as the corpus callosum, is a challenging task because of the low-signal-to-noise ratio in MR images, and the variation in the size shape, and appearance of the anatomical structures of the brain.

BRIEF SUMMARY OF THE INVENTION

The present invention provides a method and system for corpus callosum segmentation in Magnetic Resonance (MR) images. Embodiments of the present invention robustly locate the boundary of the corpus callosum based on an active shape model with confidence weighting.

In one embodiment of the present invention, an initial corpus callosum contour is generated in an MR image. The initial corpus callosum contour can be generated based on an atlas image. A boundary of the corpus callosum in the MR image is determined by fitting the initial corpus callosum contour to the MR image using an active shape model with confidence weighting. In order to fit the initial corpus callosum contour to the MR image, a confidence weighted displacement value is determined for each node on the contour. Each node of the contour is then adjusted by the confidence weighted displacement value to generate an adjusted contour. The active shape model is then fit to the adjusted contour, and these steps are iteratively repeated until the contour converges. The boundary determined using the active shape model with confidence weighting can be further refined based on intensity distributions in object and background regions defined by the boundary.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a method for corpus callosum segmentation in magnetic resonance (MR) brain images. Embodiments of the present invention are described herein to give a visual understanding of the segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. For example, according to various embodiments of the present invention, electronic data representing a target MR image, as well as electronic data representing training images for an active shape model are manipulated within a computer system.

The segmentation method of the present invention locates a boundary of the corpus callosum (CC) in sagittal MR images. According to embodiments of the present invention, this method utilizes an Active Shape Model (ASM) which is adjusted by confidence weighting boundary movement. An ASM is a statistical model of the shape of an object (e.g., the corpus callosum) which is iteratively deformed to fit the object in a current image. An ASM is generated based on training data, and incorporates prior knowledge about the object shape.

The contour of an object, such as the CC, in 2 dimensions can be described by a set of node points $(x_1, y_1), \ldots, (x_n, y_n)$. Each node point is a pixel in the image, and the set of node points define a contour which represents the boundary of the object. The coordinates of these nodes are grouped into one vector:

$$X = (x_1, y_1, \ldots, x_n, y_n)^T. \quad (1)$$

In order to train the ASM on training data, a set of contours $X_1, \ldots, X_m$ are manually labeled, and are then aligned to a template contour The template contour can be any one of the contours $X_1, \ldots, X_m$. $\overline{X}$ is the mean shape of the training contours $X_1, \ldots, X_m$, and can be expressed by $$\overline{X} = \frac{1}{m} \sum_{i=1}^{m} X_i.$$

$\Phi b$ represents the variation to the mean shape $\overline{X}$, where $\Phi$ is a matrix of the principle eigenvectors corresponding to the t largest eigenvalues of the covariance matrix S, $$S = \frac{1}{m-1} \sum_{j=1}^{m} (X_i - \overline{X})(X_i - \overline{X})^T,$$

and b is a shape parameter which weights the principal eigenvectors. Accordingly, any object contour can be modeled as follows:

$$X = M(s,\theta)\lfloor \hat{X} \rfloor + X_c, \quad (2)$$

where $\hat{X} = \overline{X} + \Phi b$, and $$[\hat{X}] = \begin{bmatrix} \hat{x} \\ \hat{y} \end{bmatrix}$$

represents every node in the vector $\hat{X}$. s denotes the scaling factor, and $\theta$ denotes the rotation angle, thus $M(s,\theta)$ represents a 2×2 scaling and rotation matrix. $X_c = (x_1^c, y_1^c, \ldots, x_n^c, y_n^c)$ represents a translation vector. These parameters are described in greater detail in T. F. Cootes et at, "Active Shape Models—Their Training and Application," *Computer Vision and Image Understanding* 61(1), pp. 38-59, 1995, which is incorporated herein by reference.

In addition to the shape model described above, an appearance model is also constructed to describe the image structure of the object in the training stage. In order to generate an appearance model, a grey profile is generated for each node point of each training contour by sampling around each node along the direction perpendicular to the object boundary. k pixels are sampled on both sides of each node point in the perpendicular direction, which gives a profile of length 2k+1 for each node point on a contour. The appearance model uses the normalized first derivative of the intensity of these samples pixels, which can be described by a vector $g_{i,j}$ of length 2k+1, where i denotes the index of a node in a contour, and j denotes the index of a contour in the training set. The appearance model is described in greater detail in T. F. Cootes et al., "Active Shape Models—Their Training and Application," *Computer Vision and Image Understanding* 61(1), pp. 38-59, 1995, which is incorporated herein by reference.

The shape and appearance model generated from the training data can be used to fit a contour on an image to define a boundary of an object in the image. Given an initial contour on the image, adjustments are estimated which move each node on the contour to an improved position. The improved position d for a node i can be defined as the point decreasing the following Mahalanobis distance metrics, $$f(g_d) = (g_d - \overline{g}_i) S_{gi}^{-1} (g_d - \overline{g}_i)^T. \quad (3)$$

where $\overline{g}_i$ is the average profile for the node i, and $S_{gi}$ is the corresponding covariance matrix. The search space for the improved position d for each node i is along the direction perpendicular to the object boundary with a length of $n_p$ on both sides on the node, where $n_p > k$. The estimated adjustment can be described by, $$dX = (dx_0, dy_0, \ldots, dx_n, dy_n). \quad (4)$$

The ASM fitting process then fits the ASM of Equation (2) to the suggested new contour position X+dX The transform $M(s,\theta)$ and $X_c$ are calculated using least square criteria to fit the mean shape $\overline{X}$ of the training sets to X+dX. The shape parameter b is then determined to fit the ASM of Equation (2). This adjusting and fitting procedure is performed iteratively until the contour converges to a final position. This iterative process is described in greater detail by T. F. Cootes et al., "Active Shape Models—Their Training and Application," *Computer Vision and Image Understanding* 61(1), pp. 38-59, 1995, which is incorporated herein by reference.

Figure 1:
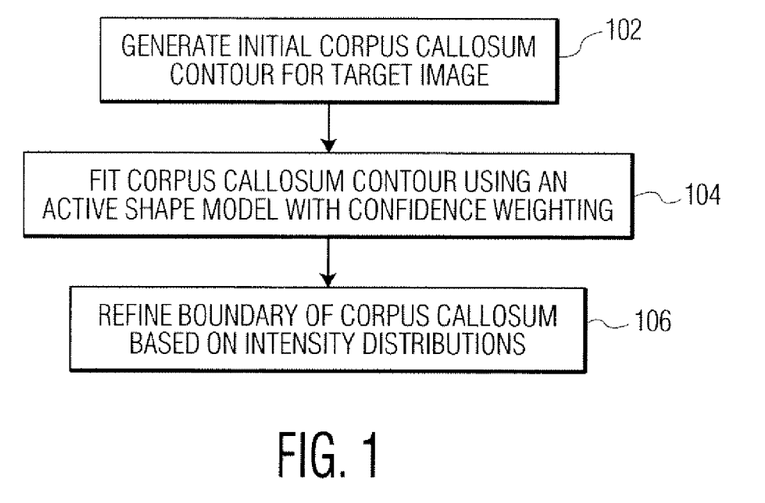
FIG. 1 illustrates a corpus callosum segmentation method according to an embodiment of the present invention.
Figure 2:
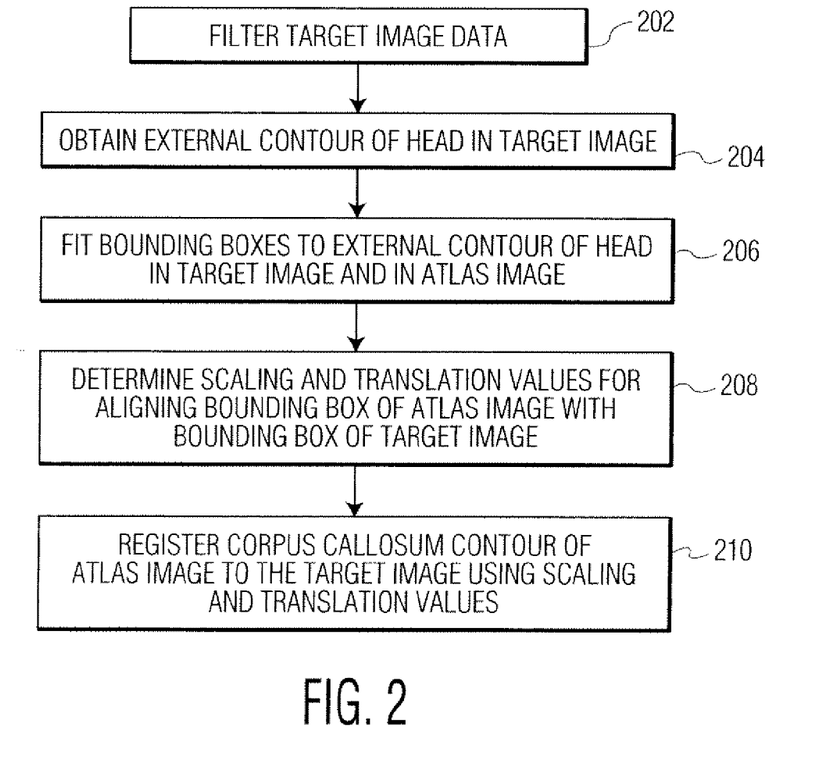
FIG. 2 illustrates a method for generating an initial corpus callosum contour for a target image according to an embodiment of the present invention.

FIG. 1 illustrates a CC segmentation method according to an embodiment of the present invention. The method of FIG. 1, segments the CC from an MR brain image. The MR image from which the CC is being segmented is referred to herein as the target image. As illustrated in FIG. 1, at step 102, an initial CC contour is generated for the target image. The initial CC contour is a contour that is an estimate of the boundary of the CC in the target image. FIG. 2 illustrates a method for generating the initial CC contour for the target image according to an embodiment of the present invention. Thus, step 102 is explained in greater detail by referring to FIG. 2.

As illustrated in FIG. 2, the initial CC contour can be generated on the target image by registering an atlas image having a known CC boundary to the target image. At step 202, the target image data is filtered. In order to smooth the target image, the electronic data representing the target image is filtered. For example, the target image can be filtered using a 5×5 median filter, but the present invention is not limited thereto. A median filter can be used to reduce the noise in an image. This filtering method replaces the intensity of each pixel with the median of its neighborhood pixel intensity. This filtering method is described in detail in A. Marion "An Introduction to Image Processing", Chapman and Hall, 1991, p 274, which is incorporated herein by reference.

At step 204, an external contour of the head is obtained in the target image. For example, a contour representing the boundary of the head can be obtained using a threshold-based region growing technique. Region growing is a technique for segmenting an object from an image. The region growing segmentation starts from a seed point and then expands the region by adding pixels with similar intensity. This is described in detail in M. Sonka et al. "Image Processing: Analysis and Machine Vision," International Thomson Publishing, 1998, p 188, which is incorporated herein by reference.

At step 206, bounding boxes are fit to the external contour of the head in the target image and in the atlas image. At step 208, scaling and translation values are determined for aligning the bounding box of the atlas image with the bounding box of the target image. More particularly, it is determined how the bounding box of the atlas image must be resized (scaling) and repositioned (translation) in order to be the same size and in the same position as the bounding box of the target image. At step 210, the scaling and translation values are used to register the CC contour of the atlas image to the target image. Accordingly, once the scaling and translation values are determined to align the two bounding boxes, the scaling and translation parameters are applied to the CC contour in the atlas image. The transformed contour is the initial CC contour for the target image.

Returning to FIG. 1, at step 104, the initial CC contour of the target image is fit to the target image using an ASM with confidence weighting. The ASM described above is a traditional ASM and does not use confidence weighting. In this traditional ASM, each node of the contour is searched for a point of best fit in the direction perpendicular to the contour, and a displacement dx is generated for each node in the perpendicular direction. However, this suggested displacement is not always correct in CC segmentation. For example, the center part of the CC is connected with another kind of tissue which is similar to the CC, so the boundary between the CC and this other tissue is often blurred, leading to the traditional ASM finding a false boundary. Thus, according to an embodiment of the present invention, the probability of the likelihood that a suggested displacement is corrected can be defined, and this probability can be used to weight the displacement dx. Accordingly, displacements with lower confidence weights contribute less to the model fitting, and the contour is less likely to converge to a false boundary.

Several different weighting schemes are possible to improve the CC segmentation results. According to an embodiment of the present invention, a set of fixed weight confidences can be defined based on prior knowledge. The bottoms of the genu and splenium and the middle part of the bottom of the CC body usually have blurred boundaries in the traditional ASM, so nodes located at these location can be considered "unreliable" and assigned low confidence weights. However, this fixed weighting does not take into account information from the target image data, and does not account for the fact that unreliable nodes may be different in different images.

According to another embodiment of the present invention, another possible confidence weighting scheme is to make use of the Mahalanobis distance between a node and its best fit point. In this case, if $f_i$ denotes the Mahalanobis distance between the node i and its best fit point, the weighted displacement can be expressed as $$dX = \left( \ldots, \frac{f_i}{\sum_j f_j} dx, \frac{f_i}{\sum_j f_j} dy, \ldots \right).$$

However, using the Mahalanobis distance to calculate the confidence weight can lead to erroneous results because some boundary nodes with high gradients may be given low weights due to large variances in the training data.

According to an advantageous embodiment of the present invention, a confidence weighting scheme can make use of the profile difference between a node and its best fit point since the profile difference describes how the structure of best fit points are similar to the node points in the training data. Accordingly, adjustments to points that are more similar to those in the training data are assigned higher confidence weights. In this embodiment, let $f_i = (g_d - \bar{g}_t)(g_d - \bar{g}_t)^T$ denote the profile difference between the node i and its best fit point d. Thus, the weighted displacement can be expressed as:

$$dX = \left( \ldots, \frac{f_i}{\max(f_i)} dx_i, \frac{f_i}{\max(f_i)} dy_i, \ldots \right). \quad (5)$$
$$\quad\quad\quad\quad i=1,\ldots,n \quad i=1,\ldots,n$$

This weighting scheme is particularly advantageous because the confidence information is determined from the target image itself.

Figure 3:
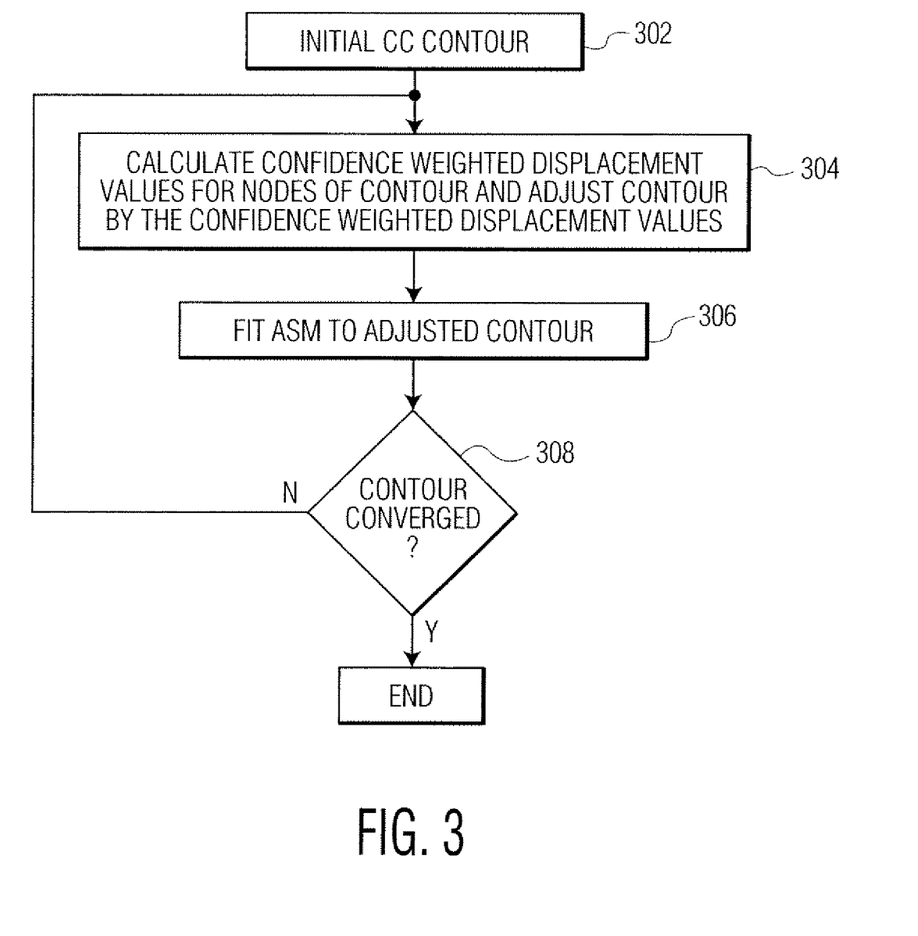
FIG. 3 illustrates a method for fitting the initial corpus callosum contour to the target image using an active shape model with confidence weighting according to an embodiment of the present invention.

FIG. 3 illustrates a method for fitting the initial CC contour to the target image using the ASM with confidence weighting according to an embodiment of the present invention. Accordingly, step 104 of FIG. 1 is explained in greater detail by referring to FIG. 3. As illustrated in FIG. 3, beginning with the initial CC contour (302), at step 304, confidence weighted displacement values are calculated for each node on the contour, and each node on the contour is adjusted by its weighted displacement value to generate an adjusted contour. As described above, a best fit point d is determined for each node of the contour, which decreases the Mahalanobis distance metrics given in Equation (3). The displacement value dx between each node i of the contour X and its best fit point d is weighted based on the profile difference between each the node i and its best fit point d, as expressed in Equation (5). The contour is adjusted X is adjusted by adjusting each node of the contour X by its weighted displacement value, resulting in an adjusted contour X+dX.

At step 306, the ASM given in Equation (2) is fit to the adjusted contour X+dX. Scaling and rotation parameters M(s, θ) and a translation vector $X_c$ for a registration are calculated using least squares criteria to fit the mean shape of the ASM training data to the adjusted contour X+dx. The shape parameter b is then determined to best fit the ASM given in Equation (2).

At step 308, it is determined if the contour has converged. For example, if an error value between the adjusted contour the previous contour is less than a small threshold value, it can be determined that the contour has converged. If the contour has converged, the method ends and the final adjusted contour represents the boundary of the CC. If the contour has not converged, the method repeats steps 304 and 306 until the contour converges.

Figure 4:
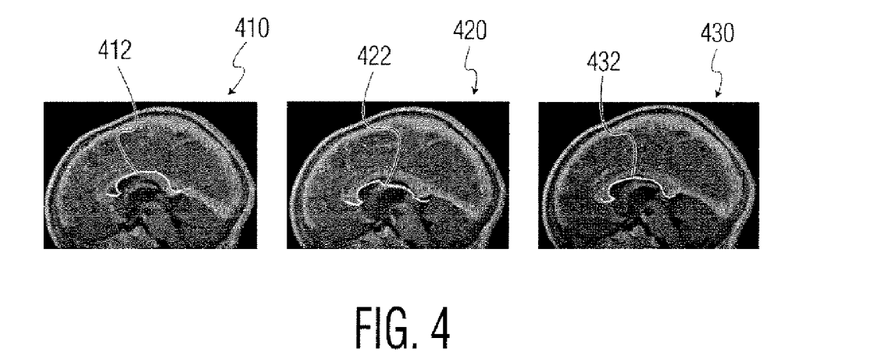
FIG. 4 illustrates an example of corpus callosum segmentation using an active shape model with confidence weighting.

FIG. 4 illustrates an example of CC segmentation using an ASM with confidence weighting. Image 410 shows an MR brain image with the initial CC contour 412. Image 420 shows results of CC segmentation using the traditional ASM without confidence weighting. As shown in image 420, a portion of detected CC boundary 422 in a false boundary that is below the actual boundary of the CC. Image 430 shows results of CC segmentation using the ASM with confidence weighting according to an embodiment of the present invention. As shown in image 430, the CC boundary 432 detected using the ASM with confidence weighting is more accurate than the boundary 422 detected using the traditional ASM without confidence weighting, Returning to FIG. 1, at step 106, the boundary of the CC determined using the ASM with confidence weighting is refined based on intensity distributions. In essence, ASM is a stochastic segmentation method which optimizes over an entire image, and it may be inaccurate locally to identify boundaries. Accordingly, most traditional ASM applications typically employ further refinement to achieve an accurate boundary. Intensity gradient based refinement is a commonly used refinement scheme for traditional ASM applications, but may not achieve accurate results in CC segmentation since some CC edges are blurred resulting in a boundary with a low intensity gradient and there are many are many irrelevant structures near the CC with high intensity gradients.

The present inventors have observed that the CC is more homogenous than the background in MR images. Accordingly, according to an advantageous embodiment of the present invention, a region-based refinement method is used to further refine the contour resulting from the ASM with confidence weighting. As described above, for each node $(x_j, y_j)$, j=1, 2, ..., n, the ASM searches for a best fit point in the normal direction with length $n_p$ on either side of the contour. All of the pixels on one side of the contour are considered to be in the object, while pixels on the other side of the contour are considered in the background. The region based refinement of this embodiment searches for a point around each node in a perpendicular direction from the contour, which best divides the pixels on the profile into background and object classes. Two Gaussian models are used to model the intensity distributions of the object and the background. During each iteration of model fitting, the parameters of the two Gaussian models are estimated from the image data on either side of the nodes of the contour as follows:

$$\mu_{obj} = \frac{\sum_{j=1}^{n}\sum_{i=1}^{n_p} I_{i,j}}{n_p n}, \sigma_{obj} = \sqrt{\frac{\sum_{j=1}^{n}\sum_{i=1}^{n_p}(I_{i,j}-\mu_{obj})^2}{n_p n}} \quad (6)$$

$$\mu_{bkgd} = \frac{\sum_{j=1}^{n}\sum_{i=n_p+1}^{2n_p+1} I_{i,j}}{n_p n}, \sigma_{bkgd} = \sqrt{\frac{\sum_{j=1}^{n}\sum_{i=n_p+1}^{2n_p+1}(I_{i,j}-\mu_{bkgd})^2}{n_p n}}$$

where $\mu_{obj}$ and $\sigma_{obj}$ are the mean and variance for the object model, and $\mu_{bkgd}$ and $\sigma_{bkgd}$ are the mean and variance for the background model. $I_{i,j}$ denotes the grey value of the ith pixel in the profile of the jth node point of the contour. The best fit point for node $(x_j, y_j)$ is defined by maximizing the following probability:

$$\prod_{i=-l}^{-1} G_{obj}(I_{i,j}) \cdot \prod_{i=0}^{l} G_{bkgd}(I_{i,j}) \quad (7)$$

where $G_{obj}$ and $G_{bkgd}$ are the object and background models, respectively, and $l$ is a constant ($l<n_p$). In each iteration, $G_{obj}$ and $G_{bkgd}$ are fitted to the image data, and instead of searching for points minimizing the Mahalanobis distance, the refinement method searches for points maximizing the probability given in Equation (7). The parameter estimation and point searching steps are performed iteratively until the method converges.

Figure 5:
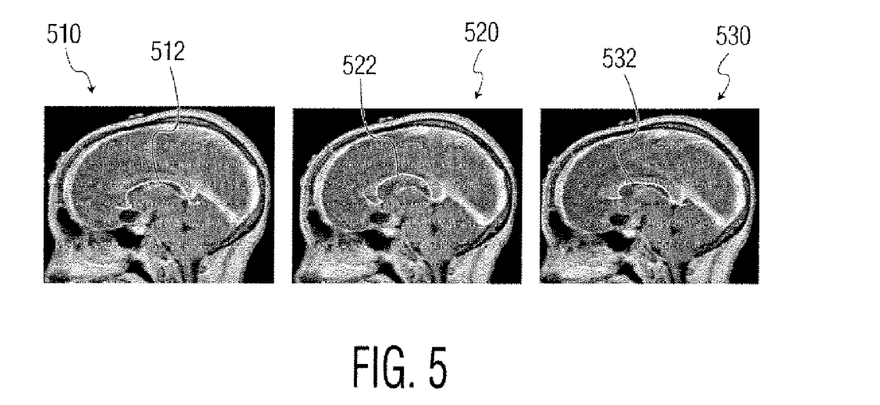
FIG. 5 illustrates an example of region based refinement of corpus callosum segmentation results.

FIG. 5 illustrates an example of the region based refinement of CC segmentation results resulting from an ASM. Image 510 shows an MR brain image with the initial CC contour 512. Image 520 shows results of CC segmentation using ASM with confidence weighting. As shown in image 520, a large portion of the detected contour 522 locates a false boundary above the actual boundary of the CC. Image 530 shows the refined results of CC segmentation resulting from the ASM with confidence weighting and the region based refinement method according to an embodiment of the present invention. As shown in image 530, the CC boundary 532 in the refined segmentation results defines a homogenous region and is more accurate than the boundary 522 detected using the ASM without region based refinement.

Figure 6:
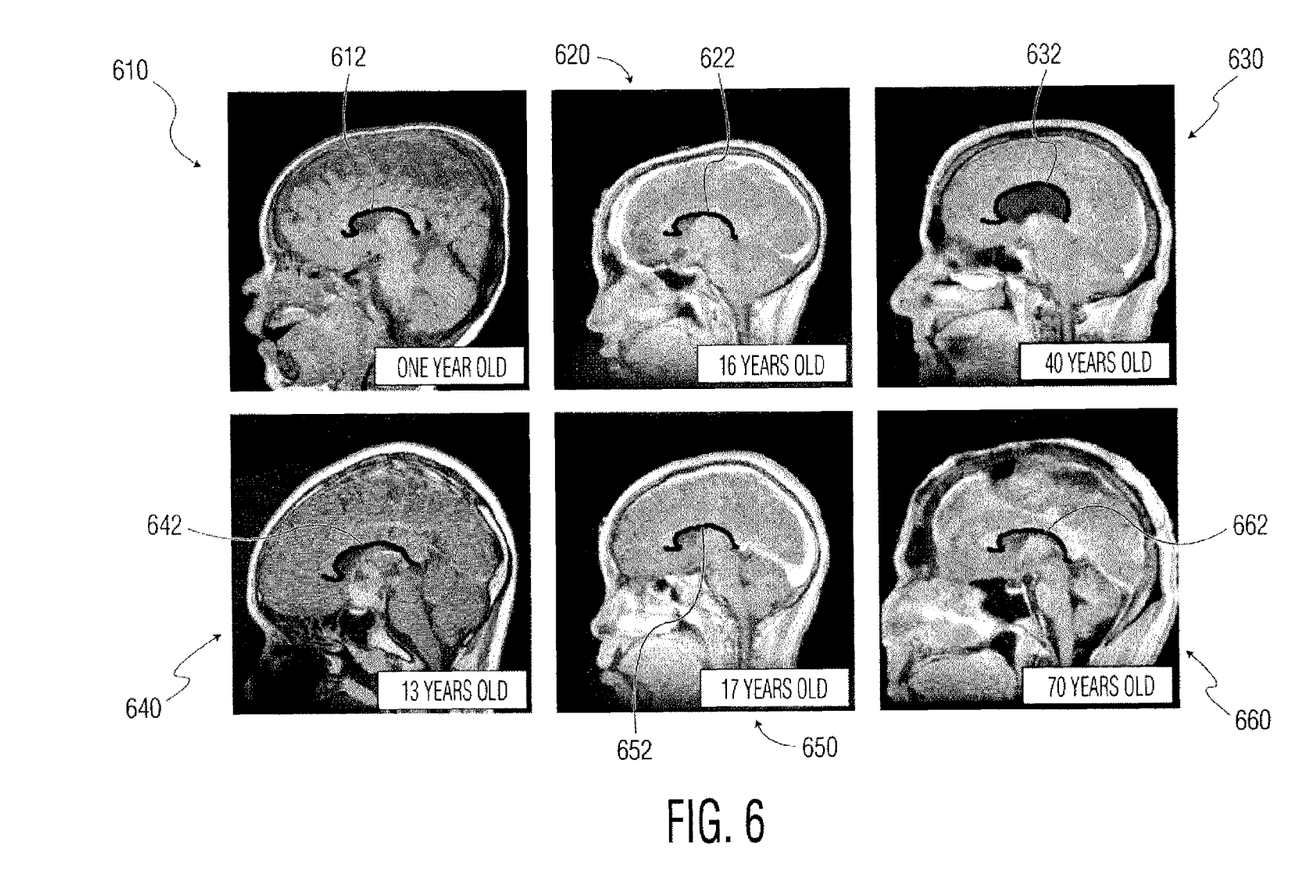
FIG. 6 illustrates exemplary CC segmentation results achieved using an embodiment of the present invention.

FIG. 6 illustrates exemplary CC segmentation results using the above described method. As illustrated in FIG. 6, images 610, 620, 630, 640, 650, and 660 are MR brain images for patients of the ages one year old, 16 years old, 40 years old, 13 years old, 17 years old, and 70 years old, respectively. Using the CC segmentation method described above, CC boundaries 612, 622, 632, 642, 652, and 662 have been detected in images 610, 620, 630, 640, 650, and 660, respectively. As illustrated in FIG. 6, this method is effective and accurate for patients with a wide range of ages.

The embodiments of the present invention described above are directed to a method for segmenting the CC is MR images. It is to be understood that the present invention is not limited to MR images, can be similarly applied to other medical images, such as CT images, PET images, X-ray images, etc.

Figure 7:
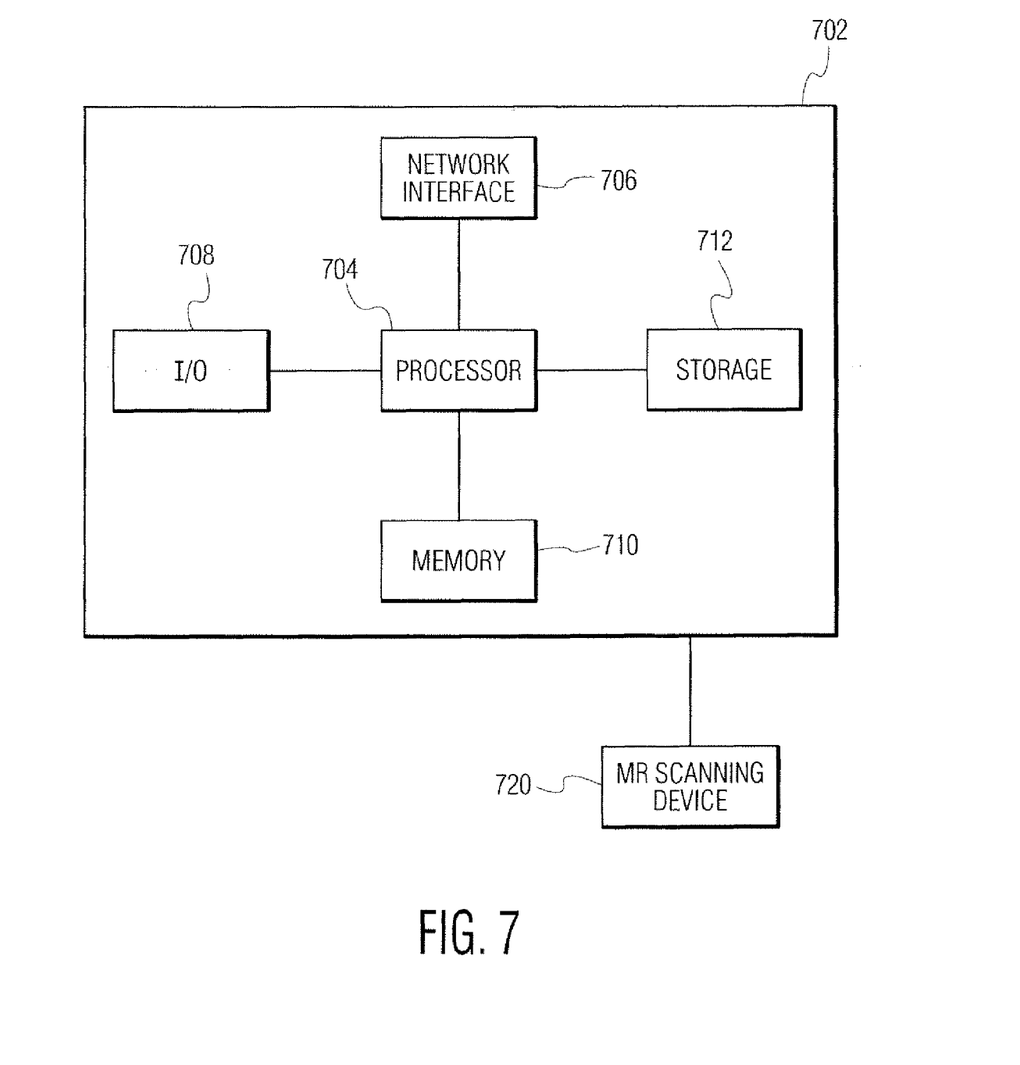
FIG. 7 is a high level block diagram of a computer capable of implementing the present invention.

The above-described method for CC segmentation can be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, applications for performing the above described method steps, including initializing a contour for an MR brain image, determining a boundary using ASM with confidence weighting, and refining the boundary using region based refinement can be defined by the computer program instructions stored in the memory 710 and/or storage 712 and controlled by the processor 704 executing the computer program instructions. Furthermore, image data corresponding to input MR brain images, resulting segmented images, and training image data for the ASM, can be stored in the memory 710 and/or the storage 712. An MR scanning device 720 which generate MR images can be connected to the computer 702 to input MR images to the computer 702. It is possible to implement the MR scanning device and the computer 702 as one device. It is also possible the MR scanning device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for corpus callosum segmentation in an MR image, comprising:
   generating an initial corpus callosum contour in said MR image;
   determining a boundary of the corpus callosum in said MR image by fitting said corpus callosum contour to said MR image using an active shape model with confidence weighting; and refining said boundary of the corpus callosum based on intensity distributions in object and background regions defined by said boundary of the corpus callosum.

2. The method of claim 1, wherein said step of refining said boundary of the corpus callosum comprises:
modeling the intensity distributions in the object and background regions using Gaussian models; and
adjusting said boundary of the corpus callosum based on said Gaussian models.

3. The method of claim 1, wherein said step of generating an initial contour comprises:
generating an external contour of a head in said MR image;
fitting a first bounding box to said external contour of a head in said MR image and a second bounding box to an external contour of a head in an atlas image;
determining scaling and translation values for aligning the first and second bounding boxes; and
registering a corpus callosum contour of said atlas image to said MR image based on said scaling and translation values.

4. The method of claim 3, wherein said step of generating an initial contour further comprises:
filtering said MR image prior to said step of generating an external contour of a head in said MR image.

5. The method of claim 1, wherein said step of determining a boundary of the corpus callosum in said MR image comprises:
(a) determining a confidence weighted displacement value for each of a plurality of nodes on said contour;
(b) adjusting a position of each node of said contour by its confidence weighted displacement value to generate an adjusted contour;
(c) fitting an active shape model to said adjusted contour; and
(d) repeating steps (a)-(c) until said contour converges.

6. The method of claim 5, wherein step (a) comprises:
determining a best fit point for each of said plurality of nodes which decreases a Mahalanobis distance between a grey profile value for each node and an average profile of said active shape model; and
weighting a displacement between each of said plurality of nodes and the best fit point for each of said plurality of nodes based a difference between the grey profile value for each node and a grey profile value for the best fit point for each node to determine a confidence weighted displacement value for each node.

7. The method of claim 5, wherein step (c) comprises:
calculating scaling and rotation parameters and a translation vector using least squares criteria to fit a mean shape of the active shape model to the adjusted contour; and
determining a shape parameter based on said scaling and rotation parameters and said translation vector to best fit the active shape model.

8. An apparatus for corpus callosum segmentation in MR images, comprising:
means for generating an initial corpus callosum contour in an MR image;
means for determining a boundary of the corpus callosum in said MR image by fitting said corpus callosum contour to said MR image using an active shape model with confidence weighting; and
means for refining said boundary of the corpus callosum based on intensity distributions in object and background regions defined by said boundary of the corpus callosum.

9. The apparatus of claim 8, wherein said means for refining said boundary of the corpus callosum comprises:
means for modeling the intensity distributions in the object and background regions using Gaussian models; and
means for adjusting said boundary of the corpus callosum based on said Gaussian models.

10. The apparatus of claim 8, wherein said means for generating an initial contour comprises:
means for generating an external contour of a head in said MR image;
means for fitting a first bounding box to said external contour of a head in said MR image and a second bounding box to an external contour of a head in an atlas image;
means for determining scaling and translation values for aligning the first and second bounding boxes; and
means for registering a corpus callosum contour of said atlas image to said MR image based on said scaling and translation values.

11. The apparatus of claim 10, said means for generating an initial contour further comprises:
means for filtering said MR image.

12. The apparatus of claim 8, wherein said means for determining a boundary of the corpus callosum in said MR image comprises:
means for determining a confidence weighted displacement value for each of a plurality of nodes on said contour;
means for adjusting a position of each node of said contour by its confidence weighted displacement value to generate an adjusted contour;
means for fitting an active shape model to said adjusted contour; and
means for determining when said contour converges.

13. The apparatus of claim 12, wherein said means for determining a confidence weighted displacement value for each of a plurality of nodes on said contour comprises:
means for determining a best fit point for each of said plurality of nodes which decreases a Mahalanobis distance between a grey profile value for each node and an average profile of said active shape model; and
means for weighting a displacement between each of said plurality of nodes and the best fit point for each of said plurality of nodes based a difference between the grey profile value for each node and a grey profile value for the best fit point for each node to determine a confidence weighted displacement value for each node.

14. The apparatus of claim 12, wherein said means for fitting an active shape model to said adjusted contour comprises:
means for calculating scaling and rotation parameters and a translation vector using least squares criteria to fit a mean shape of the active shape model to the adjusted contour; and
means for determining a shape parameter based on said scaling and rotation parameters and said translation vector to best fit the active shape model.

15. A non-transitory computer readable medium encoded with computer executable instructions for corpus callosum segmentation in an MR image, the computer executable instructions defining steps comprising:
generating an initial corpus callosum contour in said MR image;
determining a boundary of the corpus callosum in said MR image by fitting said corpus callosum contour to said MR image using an active shape model with confidence weighting; and
refining said boundary of the corpus callosum based on intensity distributions in object and background regions defined by said boundary of the corpus callosum.

16. The computer readable medium of claim 15, wherein the computer executable instructions defining the step of refining said boundary of the corpus callosum comprise computer executable instructions defining the steps of:
 modeling the intensity distributions in the object and background regions using Gaussian models; and
 adjusting said boundary of the corpus callosum based on said Gaussian models.

17. The computer readable medium of claim 15, wherein the computer executable instructions defining the step of generating an initial contour comprise computer executable instructions defining the steps of:
 generating an external contour of a head in said MR image;
 fitting a first bounding box to said external contour of a head in said MR image and a second bounding box to an external contour of a head in an atlas image;
 determining scaling and translation values for aligning the first and second bounding boxes; and
 registering a corpus callosum contour of said atlas image to said MR image based on said scaling and translation values.

18. The computer readable medium of claim 17, wherein the computer executable instructions defining the step of generating an initial contour further comprise computer executable instructions defining the step of:
 filtering said MR image prior to said step of generating an external contour of a head in said MR image.

19. The computer readable medium of claim 15, wherein the computer executable instructions defining the step of determining a boundary of the corpus callosum in said MR image comprise computer executable instructions defining the steps of:
 (a) determining a confidence weighted displacement value for each of a plurality of nodes on said contour;
 (b) adjusting a position of each node of said contour by its confidence weighted displacement value to generate an adjusted contour;
 (c) fitting an active shape model to said adjusted contour; and
 (d) repeating steps (a)-(c) until said contour converges.

20. The computer readable medium of claim 19, wherein the computer executable instructions defining step (a) comprise computer executable instructions defining the steps of:
 determining a best fit point for each of said plurality of nodes which decreases a Mahalanobis distance between a grey profile value for each node and an average profile of said active shape model; and
 weighting a displacement between each of said plurality of nodes and the best fit point for each of said plurality of nodes based a difference between the grey profile value for each node and a grey profile value for the best fit point for each node to determine a confidence weighted displacement value for each node.

21. The computer readable medium of claim 19, wherein the computer executable instructions defining step (c) comprise computer executable instructions defining the steps of:
 calculating scaling and rotation parameters and a translation vector using least squares criteria to fit a mean shape of the active shape model to the adjusted contour; and
 determining a shape parameter based on said scaling and rotation parameters and said translation vector to best fit the active shape model.

* * * * *